US010493785B2

(12) United States Patent
Kann et al.

(10) Patent No.: US 10,493,785 B2
(45) Date of Patent: Dec. 3, 2019

(54) HIGH DEFINITION STENCIL

(71) Applicant: The Boeing Company, Chicago, IL (US)

(72) Inventors: William W. Kann, Everett, WA (US); Minsu Kim, Everett, WA (US); Niles Kinman, Everett, WA (US)

(73) Assignee: The Boeing Company, Chicago, IL (US)

( * ) Notice: Subject to any disclaimer, the term of this patent is extended or adjusted under 35 U.S.C. 154(b) by 247 days.

(21) Appl. No.: 15/608,632

(22) Filed: May 30, 2017

(65) Prior Publication Data

US 2018/0345712 A1 Dec. 6, 2018

(51) Int. Cl.

| | |
|---|---|
| ***B41N 1/24*** | (2006.01) |
| ***B41C 1/14*** | (2006.01) |
| ***B43L 13/20*** | (2006.01) |
| ***B33Y 80/00*** | (2015.01) |

(52) U.S. Cl.

CPC .............. *B41N 1/248* (2013.01); *B33Y 80/00* (2014.12); *B41C 1/14* (2013.01); *B43L 13/208* (2013.01)

(58) Field of Classification Search

CPC . B41M 1/12; B41N 1/24; B41N 1/247; B41N 1/248; B41C 1/14; B44D 2/002; B44D 2/007; B44D 2/00; B44D 3/00; B44D 3/18; B44D 3/185; B05C 17/06; B43L 13/208; B43L 17/00; D05C 1/08; G09B 11/04

See application file for complete search history.

(56) References Cited

U.S. PATENT DOCUMENTS

| | | | | |
|---|---|---|---|---|
| 625,700 | A * | 5/1899 | Rost | B05C 17/06 101/128 |
| 1,684,431 | A * | 9/1928 | Behee, Jr. | B24C 1/04 451/31 |
| 2,227,325 | A * | 12/1940 | Shapiro | B05C 17/06 101/128.1 |
| 2,421,825 | A * | 6/1947 | Aulick | B05C 17/06 101/127 |
| 2,651,989 | A * | 9/1953 | Kerr | B05C 17/06 101/127 |
| 3,724,420 | A * | 4/1973 | Quinn | B05C 17/06 118/505 |
| 2007/0095223 | A1* | 5/2007 | Cox | B44D 2/002 101/129 |
| 2011/0226143 | A1* | 9/2011 | Cudworth | B05C 17/06 101/127 |

(Continued)

*Primary Examiner* — Leslie J Evanisko
*Assistant Examiner* — Marissa Ferguson-Samreth
(74) *Attorney, Agent, or Firm* — Felix L. Fischer

(57) ABSTRACT

A stencil for use in stenciling complex symbols incorporates a stencil substrate employing a flexible material, having a plurality of symbols arranged thereon. A plurality of folding stiffeners are incorporated in the substrate, each stiffener being positioned to split symbols having stencil cutouts forming isolated elements within an interior of the symbol. The stiffeners are foldable about a vertex, to collapse into a raised position and bring together the split symbol, with the stiffeners supporting the isolated elements created by the cutouts and portions of the stencil cutouts forming the symbols that extend into coincident channels in the folding stiffeners, to bridge adjoining portions of said split characters.

9 Claims, 14 Drawing Sheets

(56) References Cited

U.S. PATENT DOCUMENTS

| | | | | |
|---|---|---|---|---|
| 2016/0068013 | A1* | 3/2016 | Munoz | B44D 2/007 |
| | | | | 101/127 |
| 2016/0221380 | A1* | 8/2016 | Tarter | B44C 1/22 |
| 2018/0333976 | A1* | 11/2018 | Gupta | B41N 1/248 |

* cited by examiner

HIGH DEFINITION STENCIL

BACKGROUND INFORMATION

Field

Embodiments of the disclosure relate generally to paint stencils for applying printed matter to a surface and more particularly to a stencil having integral raised supports to engage separate elements of complex character arrangements.

Background

Signage on vehicles such as aircraft is often required for instructions and safety information. Stencils are typically employed where simple characters are needed. The stencil is placed in the desired location and paint may be applied directly to the vehicle surface through the openings in the stencil. However, decals and metalcals are typically used to depict highly detailed instructions and graphics. This is particularly true with bilingual signage where intricate characters are used such as Chinese Hanzi employed in many Asian languages.

There are certain environments, particularly in aircraft, where these decals and metalcals will rapidly degrade and are, therefore, unsuitable for use. For example, high heat combined with a high aerodynamic flow or pressure environment on an aircraft application will peel or destroy most decals or metalcals.

It is therefore desirable to provide stencils which are employable with intricate characters for enhanced application of signage using paint.

SUMMARY

As disclosed herein a first embodiment provides a stencil for use in stenciling complex symbols that incorporates a stencil substrate comprising a flexible material, having a plurality of symbols arranged thereon. A plurality of folding stiffeners are incorporated in the substrate, each stiffener being positioned to split symbols having stencil cutouts forming isolated elements within an interior of the symbol. The stiffeners are foldable about a vertex, to collapse into a raised position and bring together the split symbol, with the stiffeners supporting the isolated elements created by the cutouts and portions of the stencil cutouts forming the symbols extend into coincident channels in the folding stiffeners, to bridge adjoining portions of said split characters.

The first embodiment provides a method for forming a stencil to apply a painted marker on a surface wherein separation lines are determined to accommodate isolated elements in symbols in a marker to form the stencil elements. Stiffener strips are then inserted between the stencil elements. A CAD model is appropriately divided providing a representation of the marker symbols spaced at the separation lines according to the widths of the stiffener strips. Aligned channels are added to the separated symbol cutouts in the CAD model to create a numerically controlled (NC) template for cutting of the joined stencil substrate and stiffeners. The separated character cutouts are then created in a substrate of the stencil elements and adjoining channels in the stiffener strips. The stiffeners are folded at crease lines to merge the symbol cutouts with the stiffeners bridging the cutouts with the channels to support the stencil substrate.

A second embodiment provides a stencil for use in stenciling complex characters incorporating a stencil substrate having a plurality of symbol cutouts arranged thereon. A plurality of raised stiffeners are vertically oriented and arranged to bridge across specific cutouts with isolated elements, the stiffeners supporting the isolated elements. Portions of the specific cutouts are coincident with channels through a part of the raised stiffeners and the plurality of raised stiffeners are formed by an additive manufacturing process.

The second embodiment provides a method for forming a stencil to apply a painted marker on a surface wherein symbols desired on a stencil are introduced into a substrate to form cutouts for paint transmission to a surface. A removable filler is introduced into the cutouts at locations spanning the cutouts at isolated elements for placement of desired ribs. Vertical ribs are applied bridging the symbol in a manner to overlap the filler. The filler is then removed leaving the vertical rib bridging the cutouts.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

The embodiments and methods described herein provide stencils formed by arranging stiffener portions positioned to split complex symbols such as characters or figures having isolated stencil elements surrounded by cutouts within an interior of the symbol, where the stiffener portions bridge and support the isolated stencil elements with coextensive channels for paint entrance.

Figure 1:
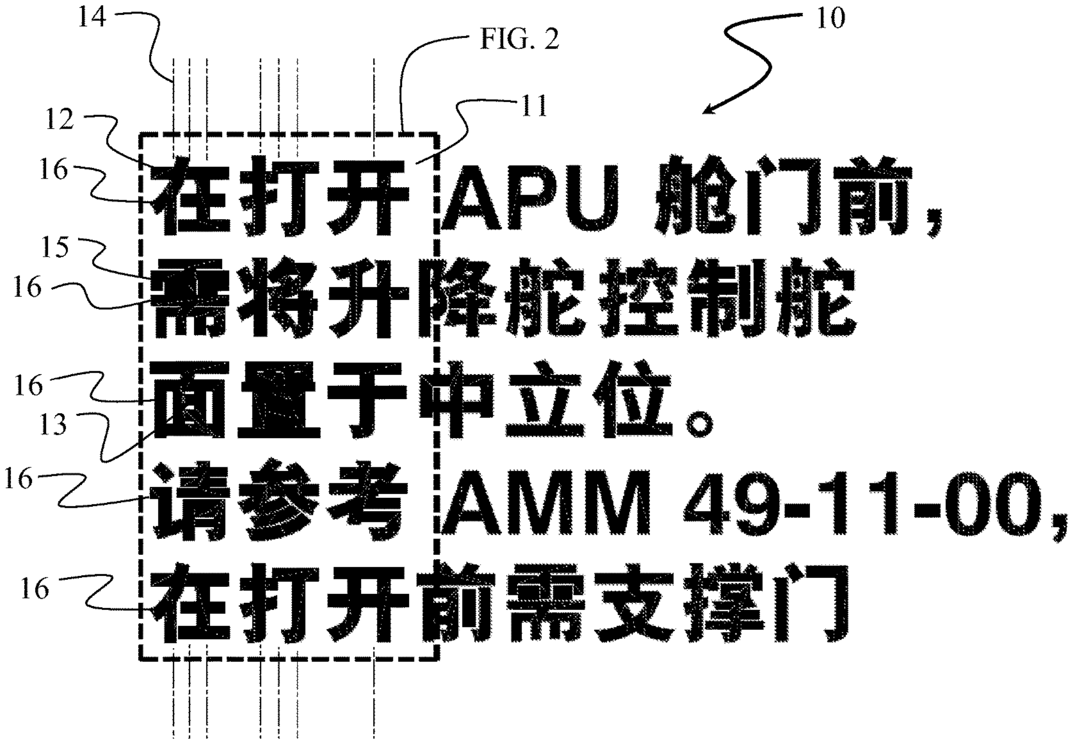
FIG. 1 is an example of bilingual character signage for use on an aircraft.

Referring to the drawings, FIG. 1 shows an exemplary placard or marker 10 (referred to herein as a "marker") having symbols forming bilingual characters with a portion of the characters being Chinese Hanzi. The block represented by outline 2 constitutes a set of characters for description of a partial stencil template 11 according to a first embodiment herein. Stencils have individual characters "cut out" of the base material to allow paint to reach the surface on which the stencil is applied. The Hanzi characters are quite complex with very closely spaced elements resulting in cutouts 12 that result in isolated "islands" 13 of material which are surrounded by portions of the cutouts or regions in the substrate 18 of the template which do not provide sufficient remaining material to be stable enough to be usable, referred to herein as "tails" 15. The islands 13 and tails 15 will be referred to herein jointly as "isolated elements" To provide structural support for the isolated elements created by the cutouts 12, separation lines 14 are chosen which run through the characters 16 crossing over or immediately adjacent to islands or tails. Individual characters may have multiple separation lines.

Figure 2:
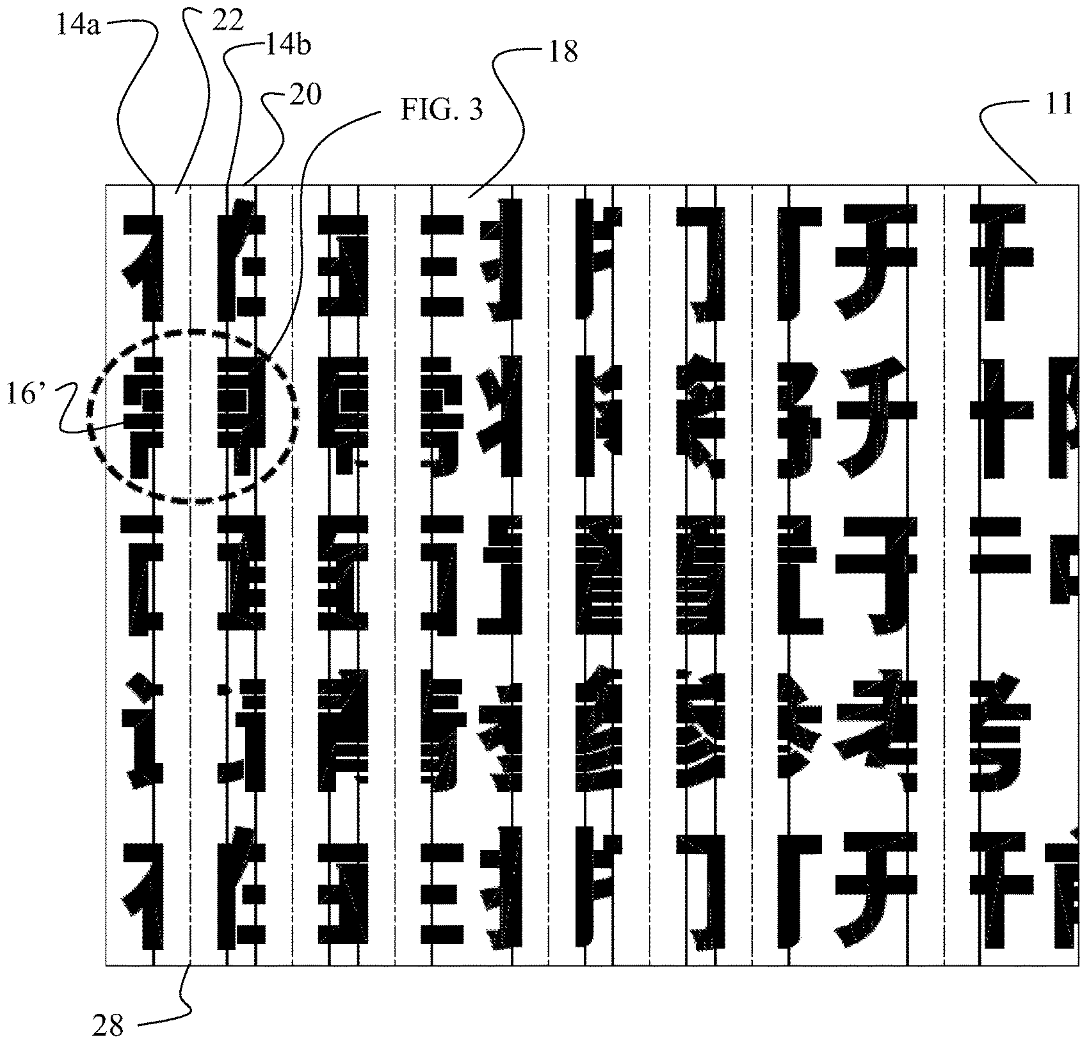
FIG. 2 is a representation of integration of the character symbols identified in block FIG. 2 of FIG. 1 in a split stencil template with integral stiffeners foldable to provide raised supports.

As seen in FIG. 2, the substrate 18 of the stencil template 11 comprises a flexible material, having a plurality of symbols arranged thereon. The symbols are arranged in portions with respect to a plurality of folding stiffeners 22 in the substrate 18, each stiffener 22 defining a region being positioned to split symbols having stencil cutouts forming isolated elements within an interior of the symbol. The folding stiffener 22 may define region such as a flat layout for forming the stiffener, for example. Accordingly, the substrate 18 includes symbols and folding stiffeners 22, where the substrate 18 is disconnected on the separation lines 14 creating edges 14*a*, 14*b* producing stencil elements 20 which split the character 16 and foldable stiffeners 22 are engaged between adjacent stencil elements. For a particular character 16' a detailed depiction is provided in FIG. 3 which constitutes an enlarged view of area 3 in FIG. 2. The stiffeners are foldable about a vertex (such as a vertical axis, for example), to collapse into a raised position and bring together the split symbol, with the stiffeners supporting the isolated elements created by the cutouts.

Figure 3:
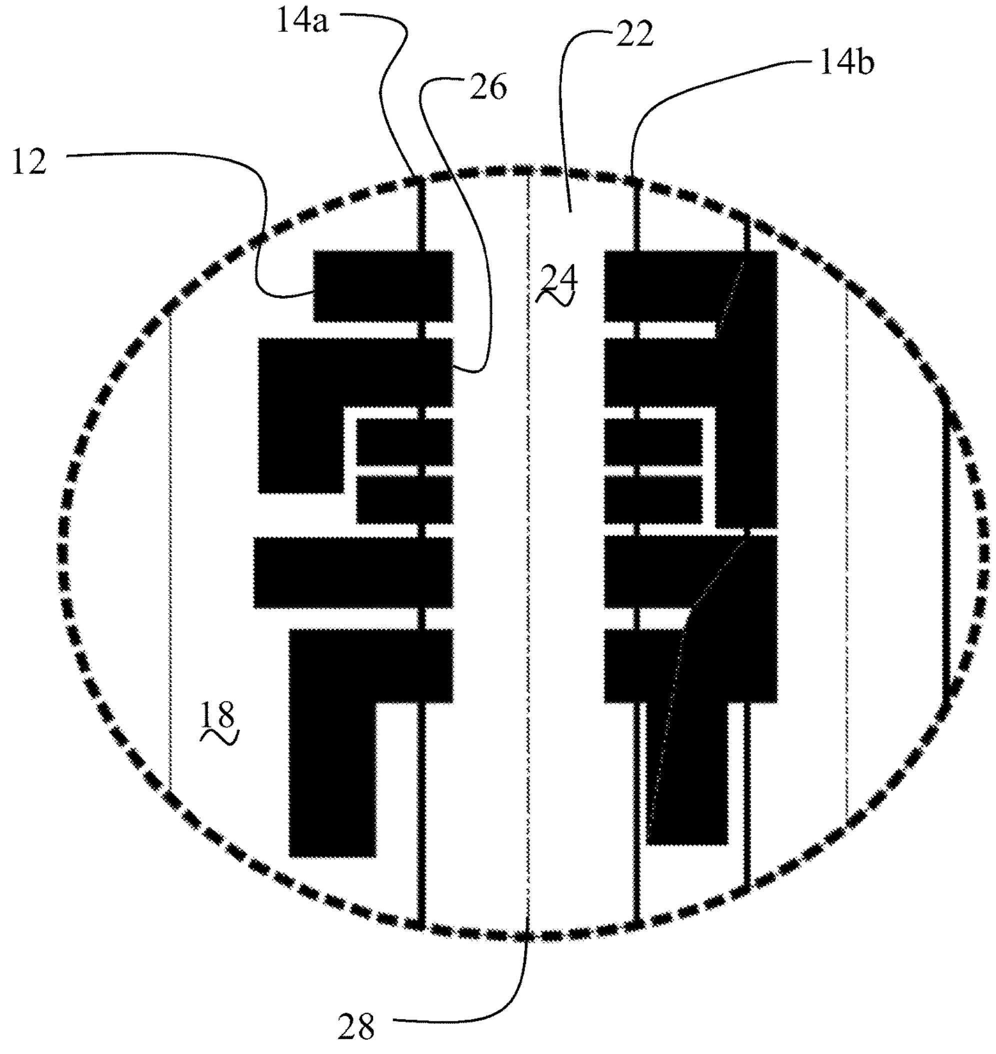
FIG. 3 is a representation of detail FIG. 3 of the template in FIG. 2.

As seen in FIG. 3, the cutouts 12 in the stencil elements 20 (as shown in FIG. 2) extend into the material base 24 of the foldable stiffeners 22 across the separation line edges 14*a*, 14*b* providing adjoining channels 26, the purpose of which will be described in greater detail subsequently. Portions of the stencil cutouts forming the symbols extend into coincident channels in the folding stiffeners, to bridge adjoining portions of said split characters. The foldable stiffeners provide support for islands and tails in the material of the stencil elements 20 between the cutouts 12 allowing the substrate 18 to maintain proper shape and spacing of the characters and the cutouts. This is particularly helpful where the substrate 18 is highly flexible material such as vinyl.

Figure 4B:
FIG. 4B is an end profile view of the template of FIG. 4A.
Figure 4A:
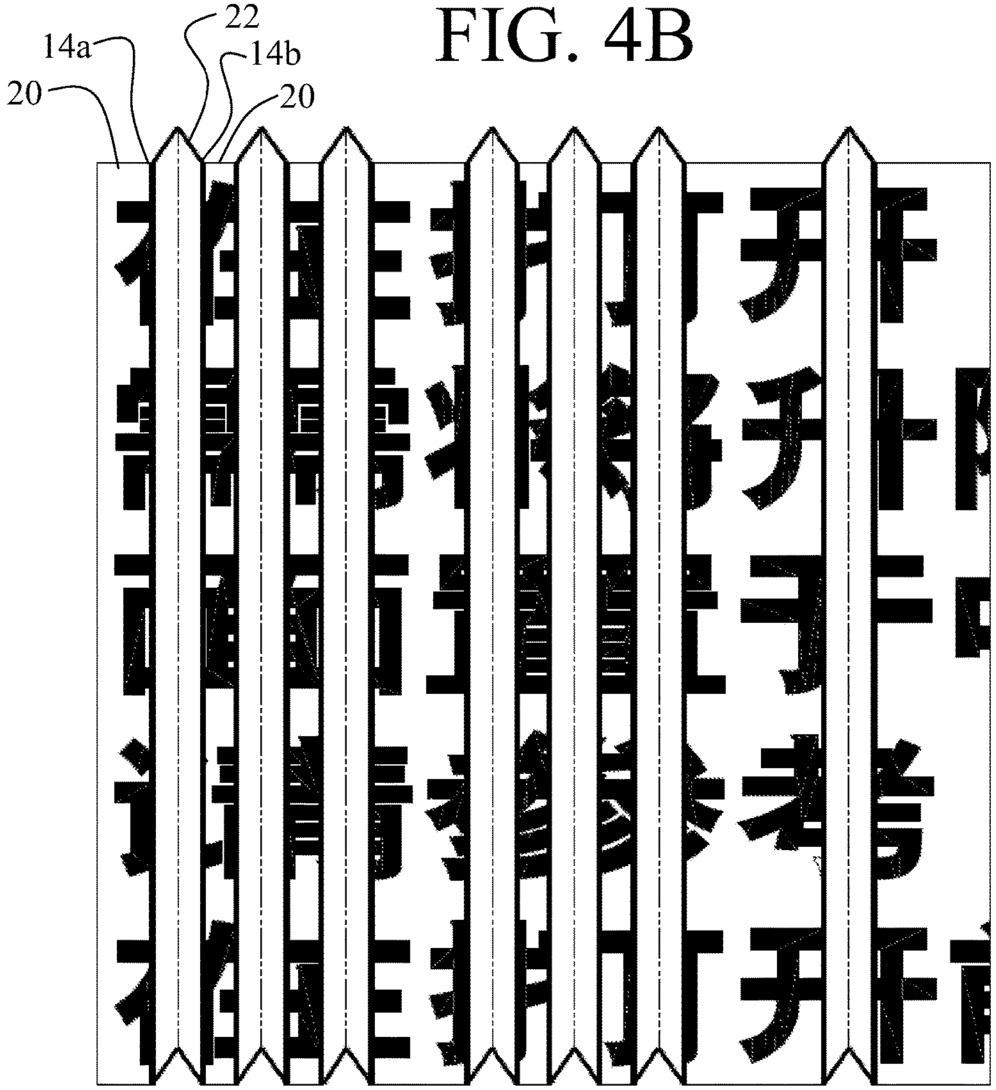
FIG. 4A is a representation of the template of FIG. 2 with the stiffeners in a partially folded position.

As seen in FIGS. 2 and 3, the foldable stiffeners 22 incorporate crease lines 28 which allow symmetrical folding of the stiffeners. As seen in FIGS. 4A and 4B with the stiffeners 22 in a partially folded configuration, as the stiffeners are folded, the stencil elements 20 are brought together with edges 14*a*, 14*b* approaching one other to merge at the separation lines 14. As seen in FIG. 4B, the stiffeners may fold in a single sided accordion arrangement.

Figure 5A:
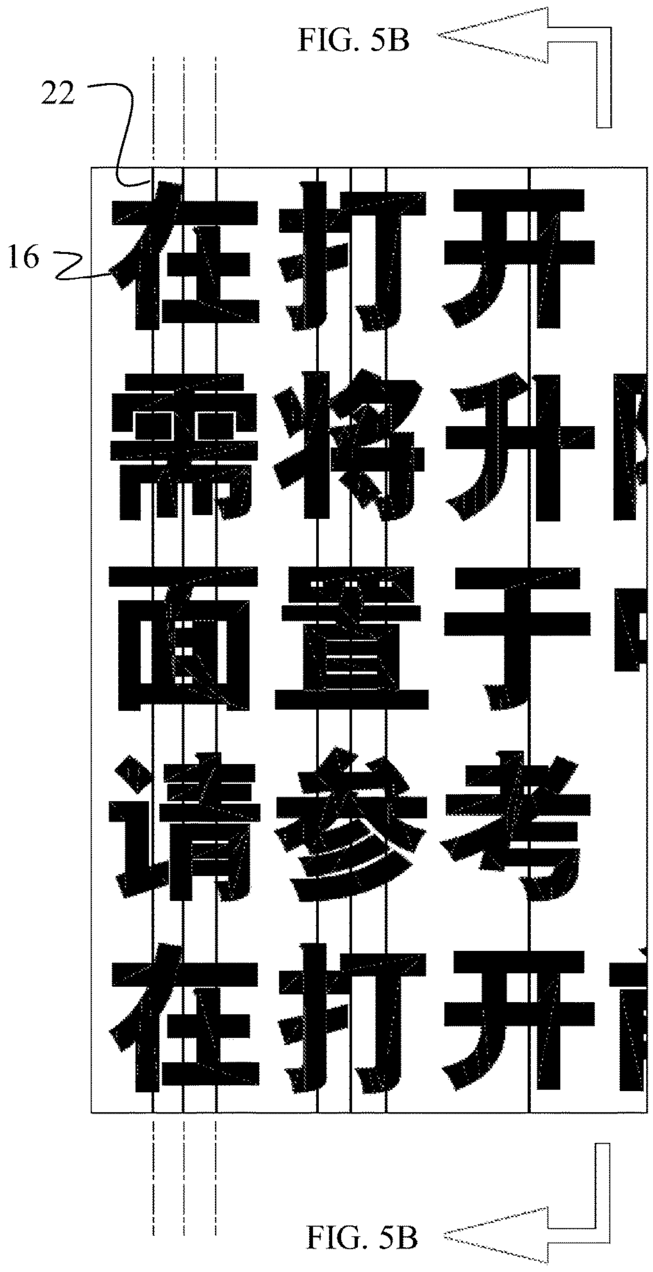
FIG. 5A is a representation of the template of FIG. 2 with the stiffeners in a fully folded position to provide the stencil for paint application.
Figure 5B:
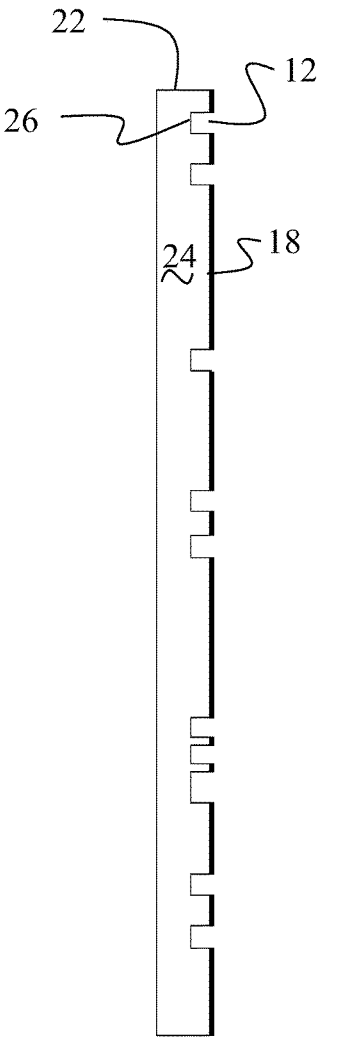
FIG. 5B is a side cut section view along line FIG. 5B-FIG. 5B of the stencil shown in FIG. 5A.
Figure 6A:
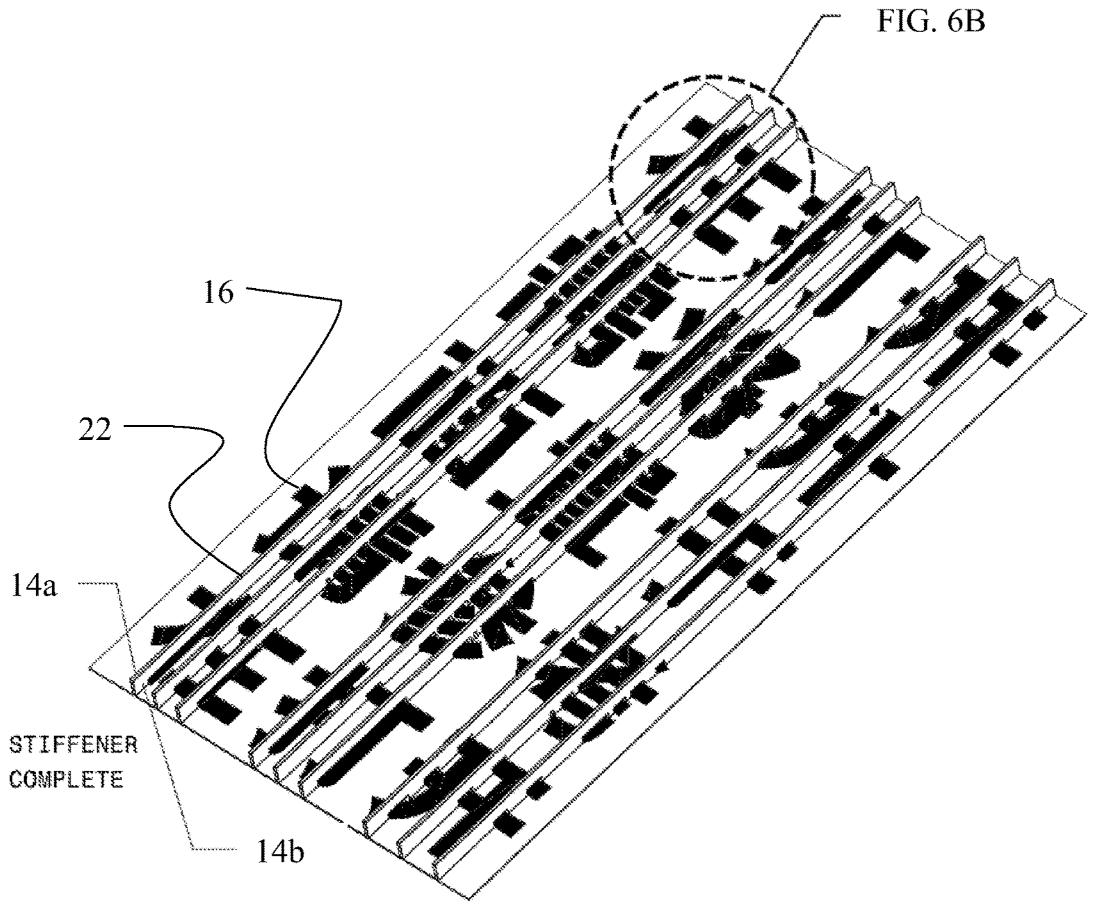
FIG. 6A is an oblique pictorial view of the stencil template with the stiffeners in the fully folded position.
Figure 6B:
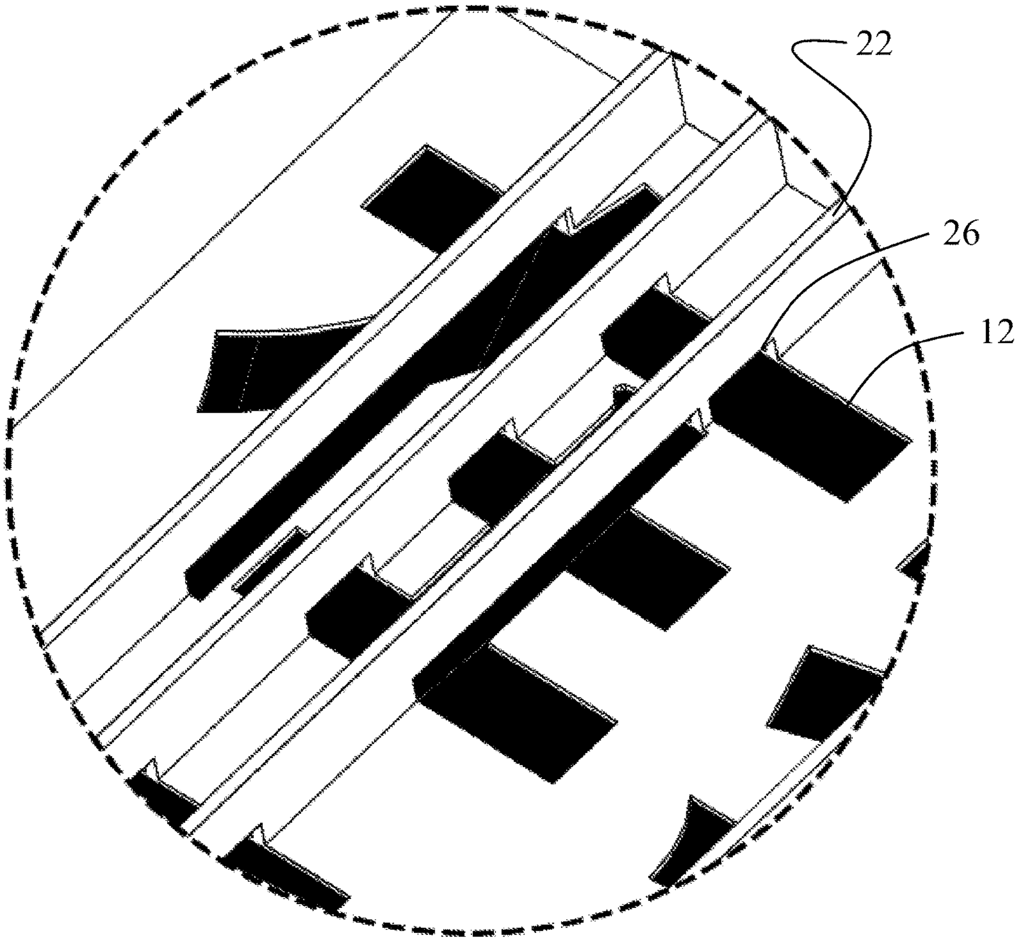
FIG. 6B is an oblique pictorial view of detail FIG. 6B of FIG. 6A.

When completely folded as seen in FIGS. 5A and 5B, the cutouts 12 of the characters 16 are once again merged at the separation lines 14 which coincides with the vertex 29 of the inner surfaces 30*a*, 30*b* of the folded stiffeners 22 (best seen in FIG. 4B). As seen in FIG. 5B, a side section view shown along line 5B-5B in FIG. 5A, the channels 26 cross through the stiffeners 22 at the cutouts 12 providing continuous flow through for paint applied to the stencil to the joined cutouts on both sides of the stiffener. The material base 24 of the folded stiffener provides a bridge over the channels 26 and cutouts 12 to support the substrate 18 of the stencil including the isolated elements between the cutouts. FIGS. 6A and 6B are oblique pictorial representations of the stencil with folded stiffeners.

Figure 7:
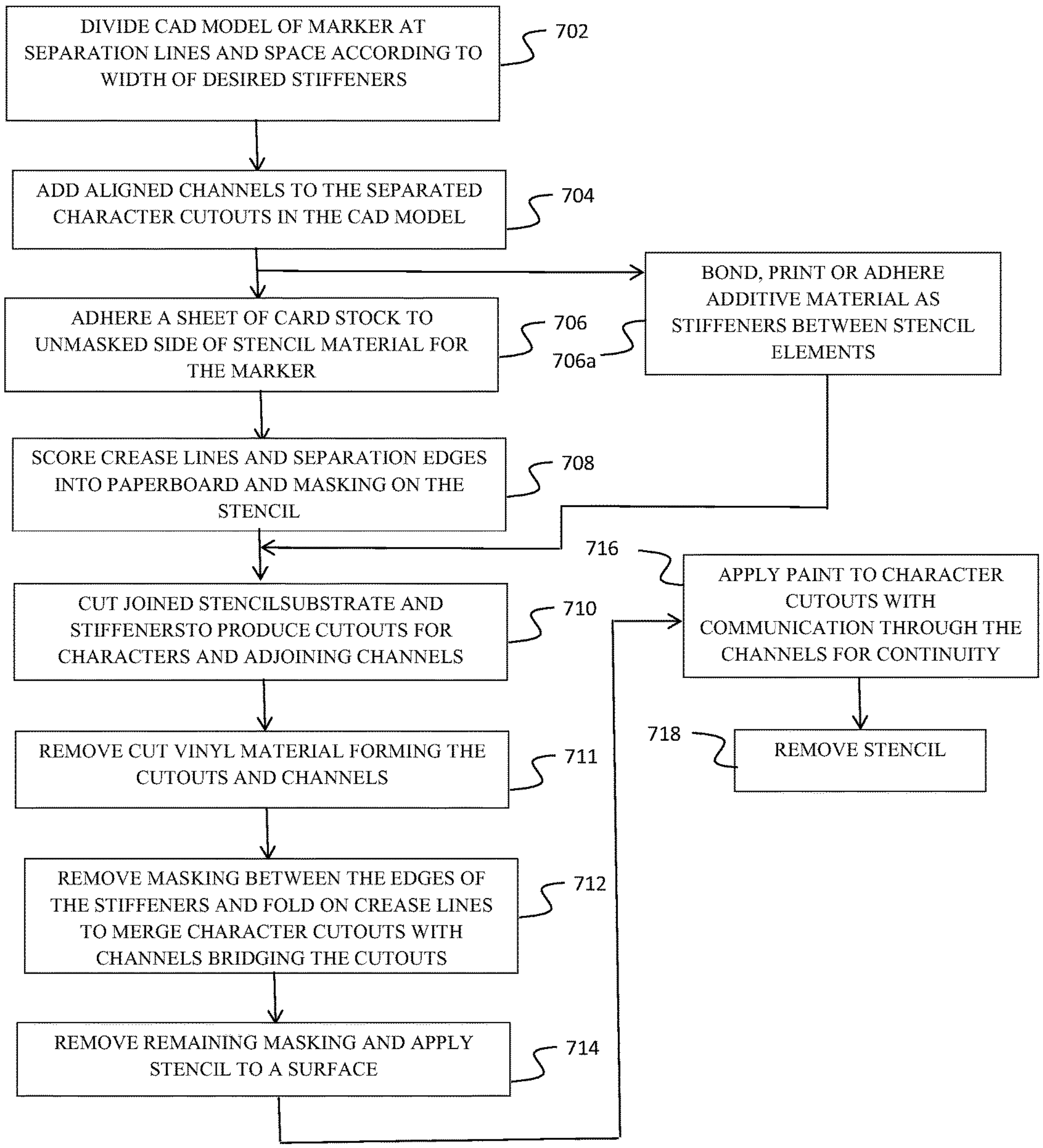
FIG. 7 is a flow chart demonstrating a method for fabrication and use of a stencil according to the first embodiment described herein.

Fabrication of the stencil with integral stiffeners may be accomplished using various techniques. An exemplary approach is shown in FIG. 7. A CAD model providing a representation of the marker characters is divided at the separation lines 14 and spaced according to the widths of the stiffener 22, step 702, and aligned channels 26 are added to the separated character cutouts 12 in the CAD model, step 704. A sheet of card stock or paperboard is adhered to an unmasked side of the stencil material, to form Substrate 18 and provide Stiffeners 22, step 706. The separation line edges 14*a*, 14*b* and the crease lines 28 at the vertices 29 for each stiffener 22 are then scored into the paperboard and the masking, step 708. The scores should be deep enough to crease the paperboard and cut the masking but not penetrate the vinyl of the stencil. The purpose of the scores is to make the stiffeners foldable. Alternatively an additive material (such as polyetherimide alloy) with greater rigidity than the stencil substrate is used to form the stiffener strips between the stencil elements. The additive material is bonded, printed or otherwise adhered to the stencil substrate at the desired locations, step 706*a*. Numerically controlled (NC) cutting of the joined stencil substrate and stiffeners employing the CAD model is then used to produce the characters 16 in the substrate of the stencil elements and cutouts for the adjoining channels 26 in the stiffeners, step 710. The cut vinyl material is then removed forming the cutouts 12 and channels 26, step 711. The masking on the vinyl stencil is removed between the edges 14*a* and 14*b*, step 712, and the stiffeners 22 are then folded on the crease lines 28, step 713, to merge the character cutouts 12 with the stiffeners 22 bridging the cutouts 12 with the channels 26 to support the stencil substrate with care being taken that the cutouts align correctly to form the graphics and text with unmasked surface adhered to unmasked surface, at every stiffener location. The remaining masking is then removed and stencil is applied to a surface on which the marker is to appear, step 714. Paint is then applied to the character cutouts 12 with communication through the channels 26 for continuity of the painted characters, step 716. The stencil is then removed, step 718.

Materials for the substrate of the stencil in the exemplary embodiment may be:

Vinyl such as AVIATION GRADE STENCIL MASK/YELLOW available from Summa, Inc. Seattle, Wash. glued in combination with paperboard such as VersaFile™ Manila produced by Westrock, Norcross, Ga. Stiffeners in the alternative embodiment may be polyetherimide alloy or similar material printed or bonded on the substrate.

Figure 8A:
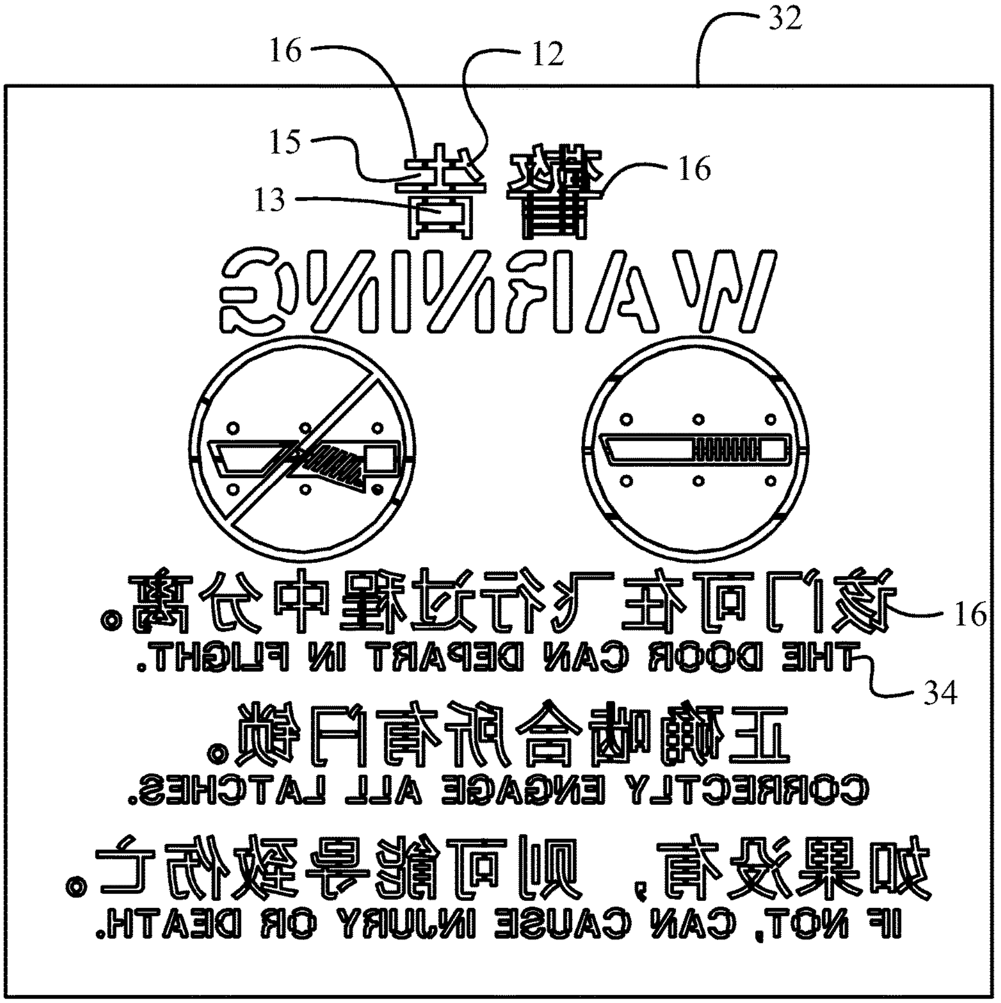
FIG. 8A is a front view of a stencil according to a second embodiment.
Figure 8B:
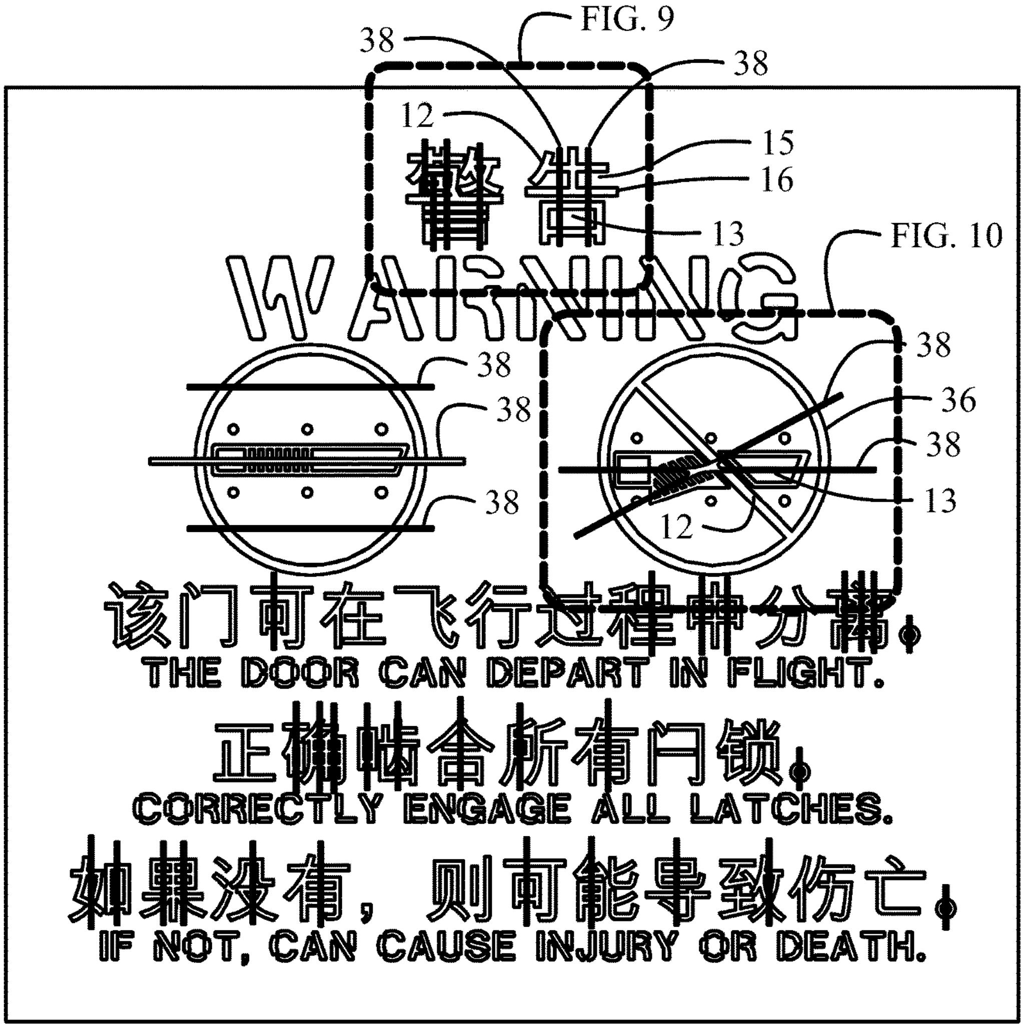
FIG. 8B is a rear view of the stencil of FIG. 8A.

As an alternative to folding stiffeners to support the stencil substrate in which symbol cutouts have already been created for characters or figures, individual vertical ribs may be fabricated onto the stencil substrate as raised stiffeners, by using additive material manufacturing techniques. An embodiment employing this technique is shown in FIGS. 8A and 8B. The front view of the template 32 in FIG. 8A shows the surface of the template which is engaged with the surface of the vehicle and the characters therefore appear reversed. The marker created by the stencil in this second embodiment also includes both English language characters 34 and Chinese Hanzi characters 16 with additional figure depictions. The Hanzi characters 16 and figures 36 both create islands 13 or tails 15 between the cutouts 12. In FIG. 8B ribs 38 are shown across portions of the cutouts in specific symbols, both characters and figures, placed to support the islands 13 or tails 15 of the substrate 18.

Figure 9:
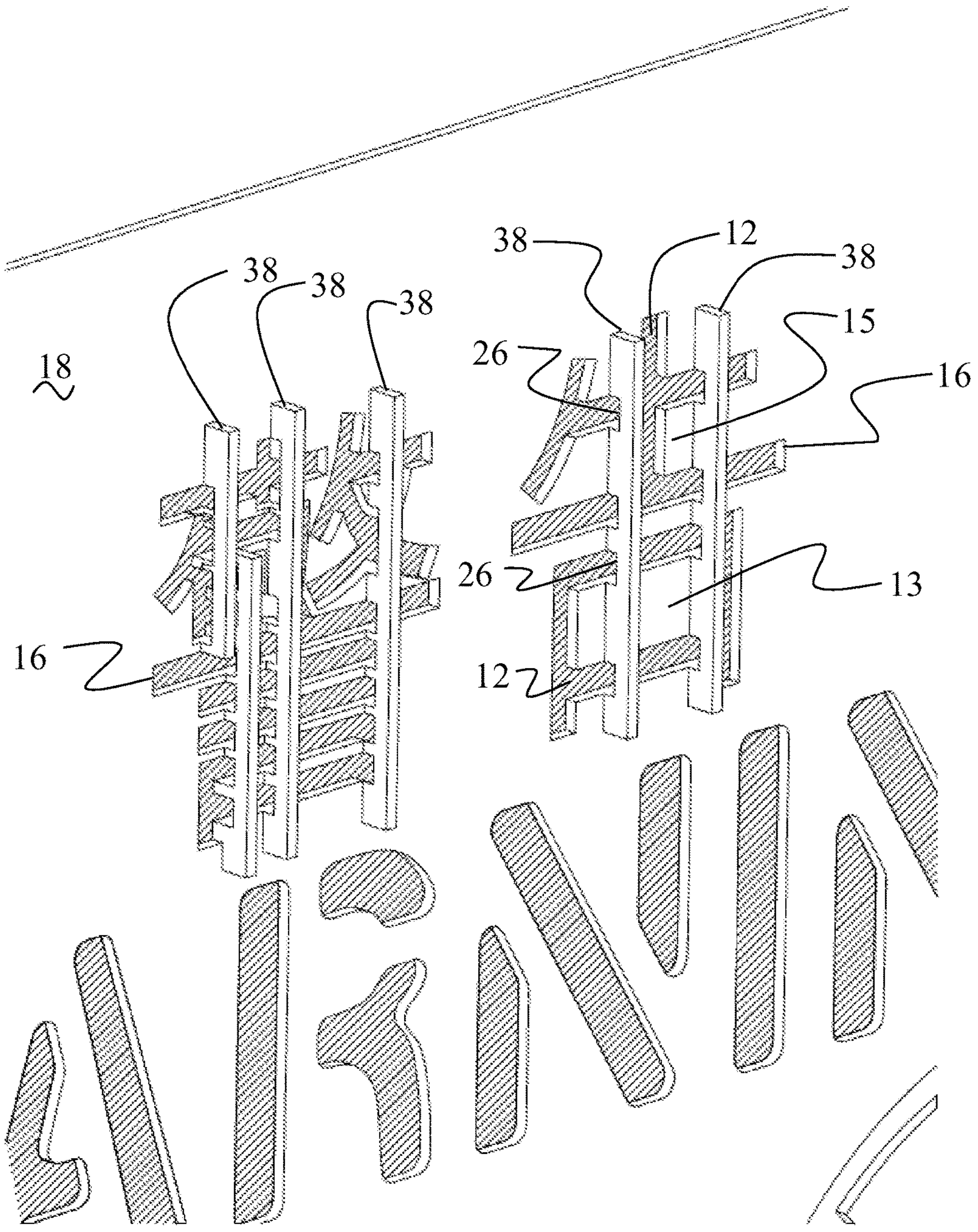
FIG. 9 is a view of detail FIG. 9 in FIG. 8B showing the raised stiffeners vertically oriented and arranged to bridge across specific character cut-outs having isolated stencil portion within an interior of the character cut-out, with the stiffeners supporting the isolated stencil portions.
Figure 10:
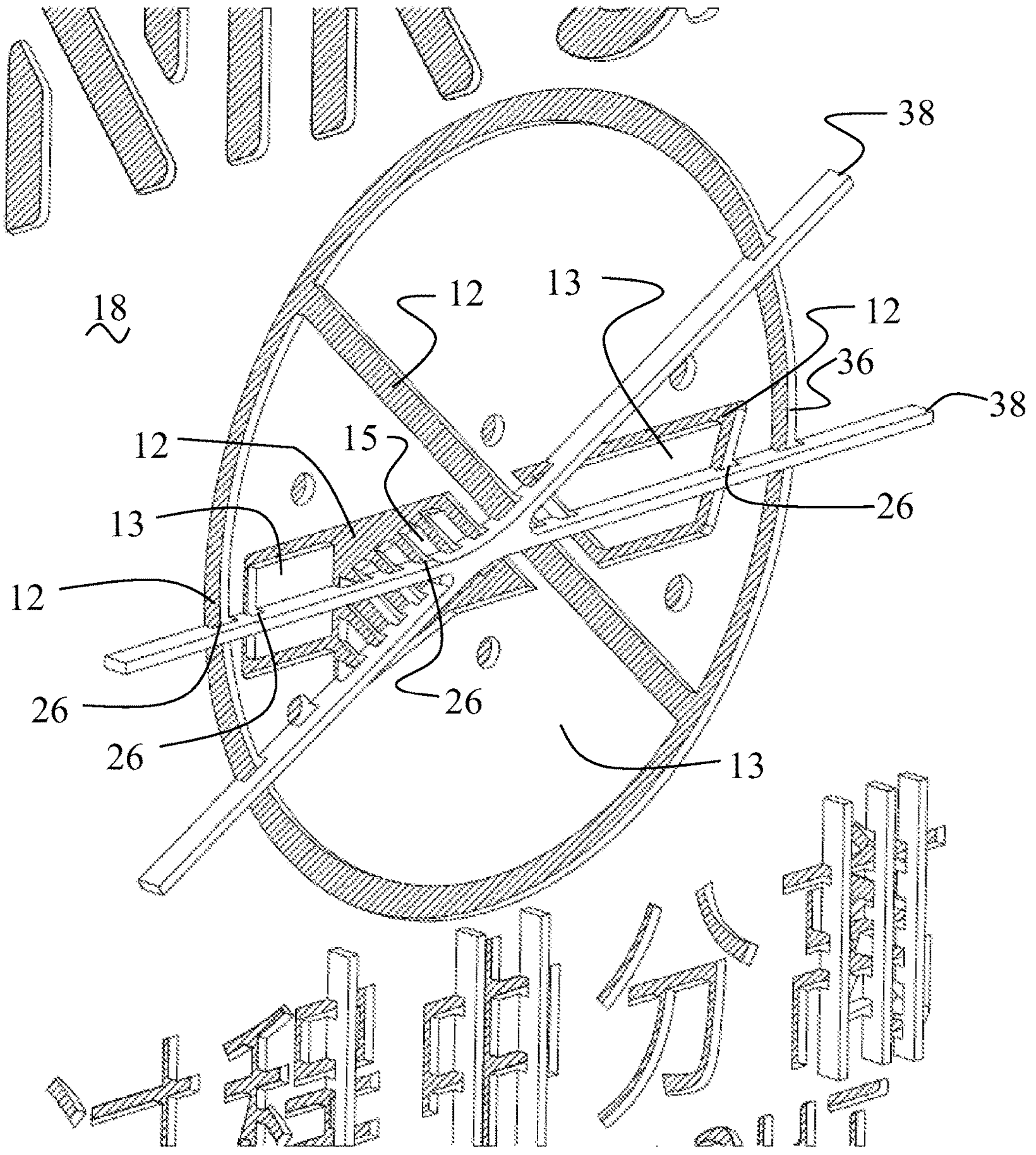
FIG. 10 is a view of detail FIG. 10 in FIG. 8B.

As seen in FIG. 9, as with the rigid stiffeners of the first embodiment, the ribs 38 bridge the cutouts 12 with channels 26. The attachment of the ribs to the material of the substrate 18 between the cutouts provides support for the islands 13 and tails 15 in the characters 16. Similarly, FIG. 10 demonstrates the structure for the symbols 36. Ribs 38 span the figures with channels 26 positioned to be coincident with the cutouts 12, the ribs supporting the islands 13 and tails 15.

Figure 11:
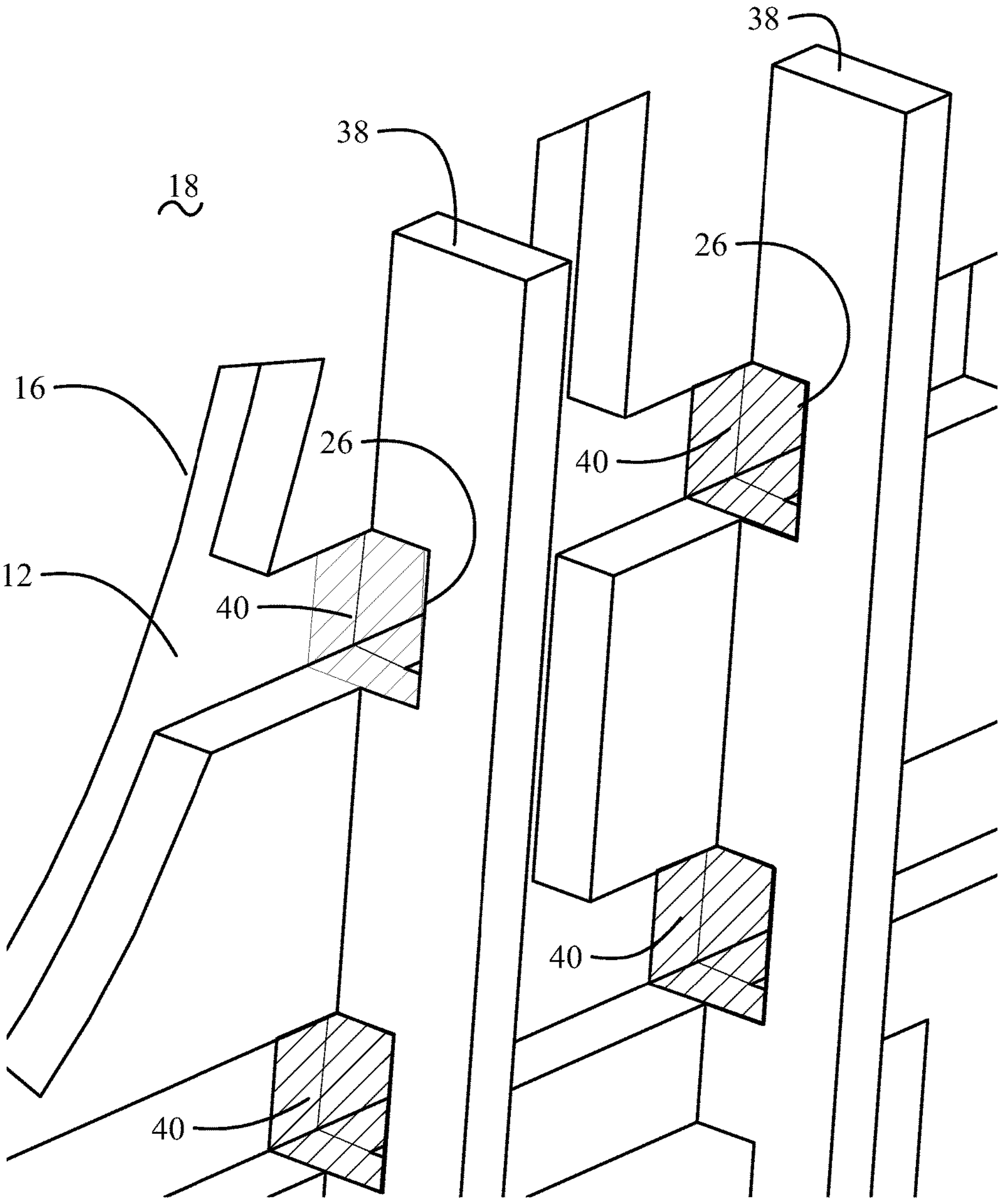
FIG. 11 is a further detailed view showing the additive element layers associated with creating the channels in the ribs communicating with the stencil cutouts; and, FIG. 12 is a flow chart demonstrating a method for fabrication and use of a stencil according to the second embodiment described herein.
Figure 12:
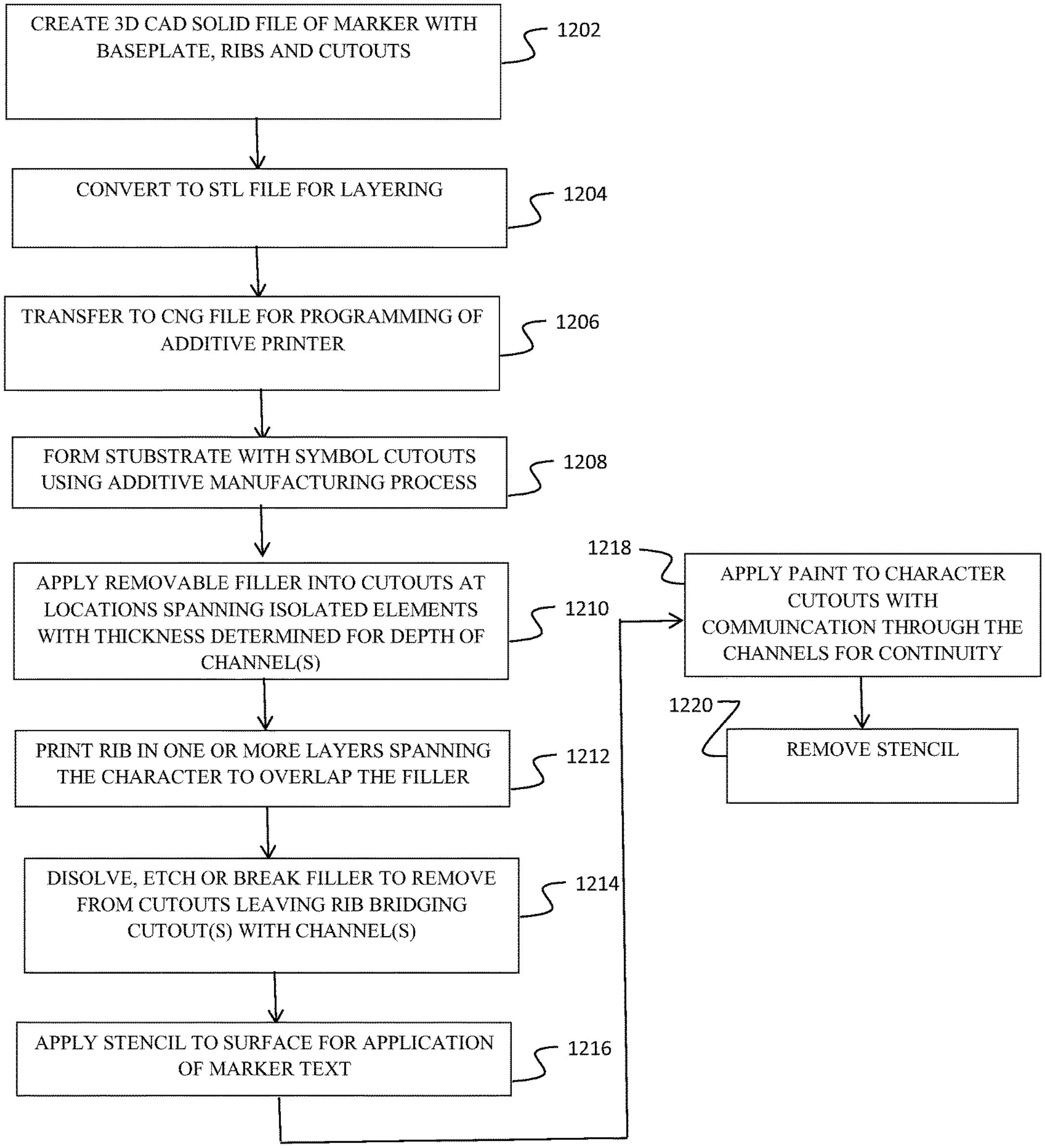

Formation of the ribs 38 with the associated channels 26 spanning the cutouts 12 is accomplished by an additive manufacturing process described with respect to FIG. 11 showing the physical elements and FIG. 12 showing the method steps. In this second embodiment, a 3D CAD solid file is created consisting of a baseplate, ribs, text cutouts and symbol cutouts, step 1202. This file is then converted to an STL file (to create layering), step 1204 and then transferred to a CNG file to provide programming to the additive printer, step 1206. The substrate with the symbol cutouts 12 is formed using an additive manufacturing printing process, step 1208. A removable filler 40 (shown in FIG. 11 as semi-transparent hatched), which may be applied in one or more layers, is introduced into the cutouts at locations spanning the cutouts at isolated elements for placement of desired ribs 38 by fused deposition or similar process, step 1210, with the thickness of the filler 40 determined to provide a desired depth for a channel 26 extending vertically coincident with the cutout 12. While the cutouts in the embodiment shown are rectangular, arcuate shaping may be employed in alternative embodiments. The rib 38 is then printed or applied, in one or more layers, spanning the character 16 in a manner to overlap the filler 40, step 1212. The filler 40 is then dissolved, etched or broken for removal from the cutouts 12 and channels 26, step 1214, leaving the rib 38 bridging over the cutouts 12 in the substrate 18 with the channels 26. The stencil is then applied to a surface on which the marker text is to be applied, step 1216. An adhesive to adhere the stencil to maintain it in place on the surface may be employed. Paint is then applied to the character cutouts 12 with communication through the channels 26 for continuity of the painted characters, step 1218. The stencil is then removed, step 1220.

For the described embodiments, an exemplary stencil material is vinyl identified as AVIATION GRADE STENCIL MASK/YELLOW available from Summa, Inc. Seattle, Wash. The thickness of this vinyl is preferably under 4 mil. Exemplary additive materials used for the fabrication of substrate and ribs are polyetherimide alloy such as Ultem 9085 available from Stratasys Inc. Eden Prairie, Minn. for the rib material and Polysulfone such as Ultem 9085 Support for the filler. An exemplary adhesive for applying the stencil to an aircraft surface is Krylon Easy-Tack Re-positional Adhesive 7020.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A stencil for use in stenciling complex symbols, comprising:
- a stencil substrate comprising a flexible material, having a plurality of symbols arranged thereon;
- a plurality of folding stiffeners in the stencil substrate, each folding stiffener being positioned to split symbols having stencil cutouts forming isolated elements within an interior of the split symbols,
- wherein the plurality of folding stiffeners are foldable about a vertex, to collapse into a raised position and bring together the split symbols, with the stiffeners supporting the isolated elements created by the stencil cutouts, and
- wherein portions of the stencil cutouts forming the split symbols extend into coincident channels in the folding stiffeners, to bridge adjoining portions of said split symbols.

2. The stencil as defined in claim 1 wherein the stencil substrate is vinyl combined with card stock or paperboard.

3. The stencil as defined in claim 1 wherein the plurality of folding stiffeners are paperboard combined with vinyl.

4. The stencil as defined in claim 1 wherein the plurality of folding stiffeners are polyetherimide alloy.

5. The stencil as defined in claim 1 wherein the stencil substrate is split on selected separation lines extending through or adjacent to the isolated elements and the plurality of folding stiffeners are engaged to the stencil substrate at the selected separation lines.

6. A method for forming a stencil to apply a painted marker on a surface comprising:
- defining separation lines determined to accommodate isolated elements in symbols in a marker to form stencil elements in a stencil substrate comprising a flexible material, having a plurality of symbols arranged thereon;
- inserting a plurality of folding stiffeners in the stencil substrate in the form of stiffener strips between the stencil elements, each folding stiffener being positioned to split symbols having stencil cutouts forming isolated elements within an interior of the split symbols;
- dividing a CAD model providing a representation of marker symbols spaced at the separation lines according to widths of the stiffener strips;
- adding aligned channels to separated symbol cutouts in the CAD model to create a numerically controlled (NC) template for cutting of a joined stencil substrate and the plurality of stiffeners;
- cutting the separated symbol cutouts in a stencil substrate of the stencil elements and adjoining channels in the stiffener strips whereby the plurality of stiffeners are foldable about a vertex, to collapse into a raised position and bring together the split symbol, with the plurality of folding stiffeners supporting the isolated elements created by the stencil cutouts; and,
- folding the plurality of folding stiffeners at crease lines on each vertex to merge the separated symbol cutouts with the plurality of folding stiffeners bridging the stencil cutouts with the adjoining channels to support the stencil substrate wherein portions of the stencil cutouts forming the split symbols extend into coincident channels in the plurality of folding stiffeners, to bridge adjoining portions of said split symbols.

7. The method as defined in claim 6 wherein the stiffener strips are paper board and further comprising:
- scoring masking on the stencil substrate on the separation lines;
- removing the masking between the separation lines and, bonding the stiffener strips when folded with an unmasked stencil.

8. The method as defined in claim 6 wherein the stiffener strips are polyetherimide alloy and further comprising:
- determining an added width of the stencil substrate to accommodate the stiffener strips; and,
- depositing the stiffener strips on the stencil substrate centered on the separation lines.

9. The method of claim 6 further comprising:
- applying the stencil to a surface on which the marker is to be applied;
- applying paint to the separated symbol cutouts with communication through the adjoining channels for continuity of the painted symbols; and, removing the stencil from the surface.

* * * * *